United States Patent

[11] 3,599,995

[72] Inventors Michael J. Rafalski, Jr.
602 S. Falcon St.;
Blase G. Celmer, 506 Koszciuszko St., both of South Bend, Ind. 46619
[21] Appl. No. 836,800
[22] Filed June 26, 1969
[45] Patented Aug. 17, 1971

[54] SEALING GASKET AND PIPE REPAIR CLAMP
3 Claims, 6 Drawing Figs.
[52] U.S. Cl. ................................................. 277/208
[51] Int. Cl. ............................................... F16j 15/06
[50] Field of Search ........................................... 277/207, 208, 134

[56] References Cited
UNITED STATES PATENTS
2,616,736  11/1952  Smith ........................... 277/208
3,334,988  8/1967  Schmunk ...................... 277/208

Primary Examiner—Robert I. Smith
Attorney—William N. Hogg

ABSTRACT: A band clamp and sealing gasket for use in repairing a pipe is provided which has a plurality of beads extending circumferentially about the inner surface of the gasket. The beads perform the sealing function to seal the leak in the pipe. The gasket is also provided with a lip extending around each side thereof, having a groove which engages the band clamp to maintain the gasket in position during transportation and application, but which will allow the gasket to flow during the clamping operation to repair a leak.

PATENTED AUG 17 1971          3,599,995
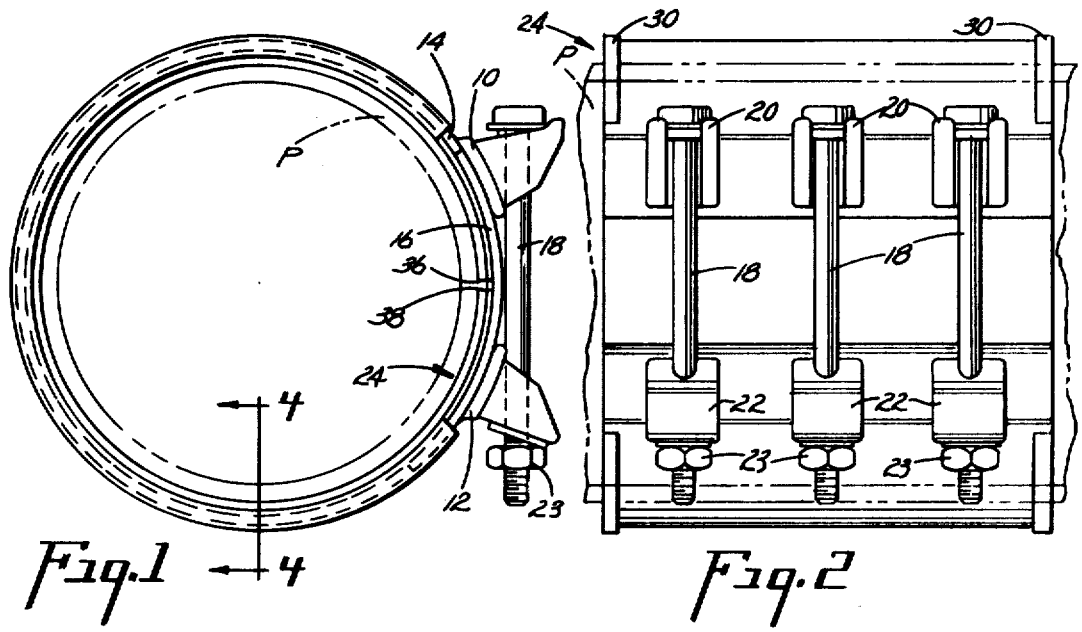
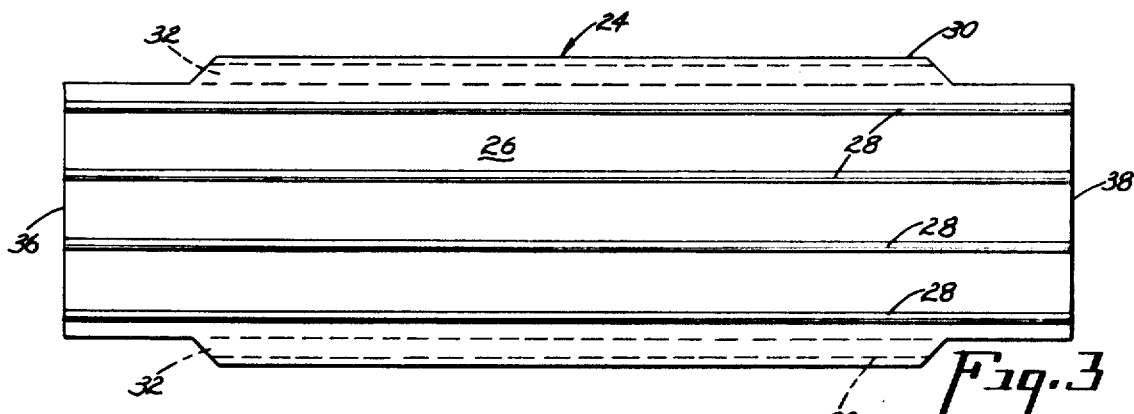
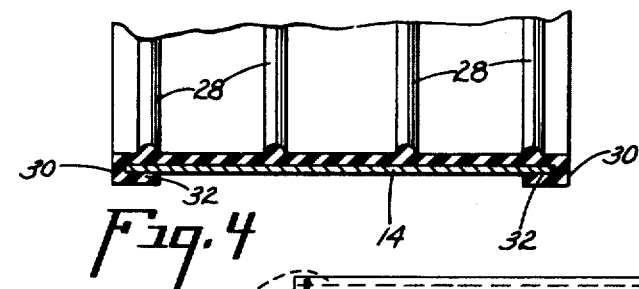
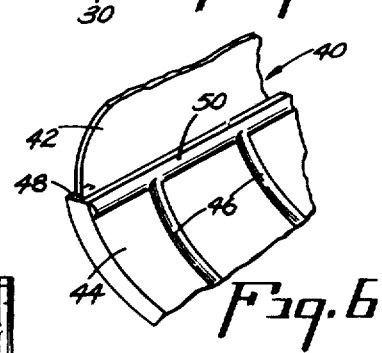
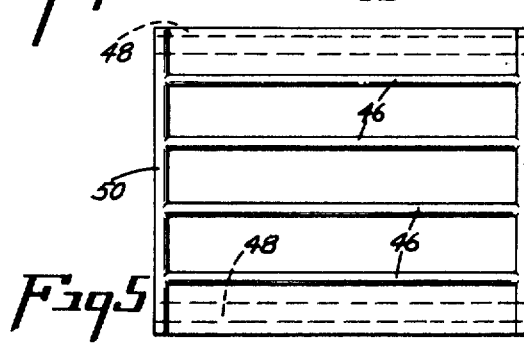
MICHAEL J. RAFALSKI JR.
BLASE G. CELMER
INVENTOR
BY J. W. Douglas
their ATTORNEY

SEALING GASKET AND PIPE REPAIR CLAMP

BACKGROUND OF THE INVENTION

This invention relates generally to gaskets, and more particularly to gaskets for band clamps which are used to repair leaks in fluid-transmitting pipes.

One of the principal ways of repairing fluid-conducting pipes, especially cast iron and asbestos composition pipe, is by the use of band clamps which utilize elastomeric gaskets of some type. The band clamp encircles the pipe to be repaired, and the elastomeric gasket is interposed between the clamp and the pipe. As the clamp is tightened, is squeezes the gasket into a sealing relationship with the pipe. The constriction of the clamp against the elastomeric material, and the flow of the elastomeric material during the tightening physically seals the leak in the pipe.

The prior art gaskets have taken many different forms and have been secured to the band clamp in many different ways.

One of the principal forms that the prior art gaskets have taken is the form of a flat sheet of elastomeric material. Other forms have included a surface configuration which is imprinted with a "waffle"-type impression. Each of these surface types has certain disadvantages. The flat sealing surface is rather ineffective and requires a rather high torque pressure to effect even minimal sealing. The waffle pattern, while being somewhat more effective in sealing, adds greatly to the cost, since this type of pattern requires that the gasket be formed by molding techniques which are relatively expensive.

The prior art gaskets also have incorporated several different techniques in securing them to their respective band clamps, so that they will be maintained in position during shipment and properly placed during application of the clamp. These techniques include the bonding of a portion of the gaskets to the overlying band, such as by an adhesive, and also the use of separate plastic clips which mechanically hold the gaskets in place.

These prior art securing techniques also have certain drawbacks. In the case of the gaskets which are cemented to the band clamps, the cemented area is not free to flow with respect to the overlying clamp, thus restricting their ability to flow during the sealing operation, which flow is necessary to obtain a good seal at relatively low clamping pressures, especially in case of gaskets which completely encircle the pipe with their opposite ends abutting each other. The techniques of mounting the gasket on the band by means of clips has certain obvious drawbacks, in that the clips can become disengaged during shipping and allow the gasket to move out of its proper position, or the clips can interfere with the sealing operation. Also, the clips are separately formed, and constitute an additional cost since they are separate articles which must be provided with each seal, and then upon application are discarded as being of no further use.

SUMMARY OF THE INVENTION

The present invention provides a gasket for use in the band clamp which has a lip formed integrally therewith which is adapted to engage the band clamp and maintain the gasket in position during shipping and application of the clamp, but which will not restrict the flow of the gasket during application. The gasket is also formed with a plurality of circumferentially extending beads which provide an extremely effective fluid seal at relatively low clamping pressures. This configuration also allows the gasket to be formed by extrusion rather than molding, thus making the gasket relatively inexpensive to manufacture.

BRIEF DESCRIPTION OF THE DRAWING

FIG. 1 is an end elevational view of a pipe repair clamp employing a gasket of this invention in sealing a leak on a pipe;

FIG. 2 is a side elevational view of the device of FIG. 1;

FIG. 3 is a view of the gasket of the present invention laid flat with the sealing surface exposed;

FIG. 4 is a sectional view taken substantially along the plane 4—4 of FIG. 1;

FIG. 5 is a plan view of gasket laid flat, which gasket is designed for less than full encirclement of the pipe; and FIG. 6 is a fragmentary perspective view of a band clamp utilizing the gasket of FIG. 5 which terminates short of full encirclement of the pipe.

DESCRIPTION OF PREFERRED EMBODIMENTS

Referring now to the drawings, and for the present, to FIGS. 1 and 2, the sealing gasket of this invention is shown being utilized with a band clamp. The clamp illustrated is of the type shown and described in the application, Ser. No. 836,910 filed July 26, 1969 entitled Pipe Repair Clamp. However, it is to be understood that the gasket of this invention can be employed with other styles and types of band clamps, and that this clamp configuration is shown merely by way of illustration.

As can be seen in FIGS. 1 and 2, the band clamp illustrated comprises a pair of castings 10 and 12 which have secured thereto a band member 14. The band member 14 is adapted to extend circumferentially from one casting 10 completely to the other casting 12, and circumferentially surround a pipe to be repaired. A bridge member 16 is provided secured to the band 14 adjacent the casting 10. The bridge member spans between the castings 10 and 12 to provide a completely enclosed metallic encircling ring.

The type clamp shown is the type having three bolts 18 extending between lugs 20 and 22 formed on the castings 10 and 12 respectively. Nuts 23 are threaded on the ends of the bolts 18. The coaction of the bolts 18 with the lugs 20 and 22 cause the castings 10 and 12 to move closer together when the nuts 23 are tightened, thus decreasing the diameter of the encircling band 14. This decrease in diameter in turn applies clamping pressure to a gasket designated generally as 24, which gasket is interposed between the clamp and the pipe P to be repaired.

The gasket 24 of the present invention is formed of an elastomeric material, such as synthetic or natural rubber and is shown laid out flat in FIG. 3. The gasket 24 has a main or central portion 26. One face of the main portion 26 has formed thereon a plurality of longitudinally extending beads 28, which extend substantially from one end 36 of the gasket to the other end 38. A pair of lips 30 is provided on outer marginal edges of the gasket 24, which lips terminate short of both ends of the main body 26. These lips 30 define grooves 32, which are adapted to engage the edge of the band 14 in the manner shown in FIG. 4.

The gasket is inserted into the clamp in the manner shown in FIGS. 1 and 2 with the bolts 18 loosened. The walls of the grooves 32 firmly engage the band 14, thus positively positioning the gasket within the clamp. (It is to be understood that the lip and groove configuration could be limited to one edge of the gasket, but it is preferable that it be on both edges.) The termination of the lips 30 short of the end of the main body 26 of the gasket prevent the lips from interfering with the castings 10 and 12 which are substantially thicker than the band member 14. The opposite ends 36 and 38 of the gasket 24 are disposed to meet in abutting relationship.

In order to apply the gasket and the clamp, the bolts 18 are completely loosened, and the clamp with the gasket 24 positioned therein is then placed around the pipe P at the location where the leak is to be sealed. The lips 32 positively position the gasket so that, where the opposite ends 36 and 38 thereof meet, the ends of each of the beads 28 will be substantially in alignment and hence each of the beads will form a substantially continuous circumferential ring seal. The bolts are then tightened to apply clamping pressure to the seal, and the clamping pressure will squeeze the gasket 28 into sealing engagement with the pipe. Since the gasket is not bonded to the band at any place, it is free to flow at all location therearound to conform as required by the pressure, to the most effective sealing configuration.

With the gasket of the present invention, the sealing takes place almost completely along surfaces of the beads 28. This is in contradistinction to the prior art flat face gaskets wherein the sealing is taking place over the entire face of the gasket. Because the total force being applied to the band clamp is being concentrated in relatively narrow strips defined by the beads, as opposed to being spread out over the entire face of the gasket, as is the case of the flat-faced gaskets, much less total force is required to provide an effective seal than is required when a flat face gasket is used. By virtue of the fact that the beads have a very small total area of contact a normal force applied results in a very large pressure in terms of force per unit area in contact. Thus a great sealing pressure is generated in the small areas where required without the use of an excessively high total clamping force. In effect, each of the beads 28 is functioning as a small independent ring seal, with the sealing taking place between two of these adjacent rings. Hence, the function of sealing is performed by a gasket itself defining fluid chambers between each of the adjacent beads, the sealing being principally around the beads as ring seals and not by the surface pressure of the gasket holding the fluid in the pipe. Thus, the sealing is not so much related to holding the fluid within the pipe and preventing its escape, but rather the sealing is much more effectively performed by containing the escaping fluid within a fluid tight chamber defined by adjacent beads sealing with great pressure over a narrow area against the pipe. This has proved to be a very effective sealing configuration which seals at a relatively low torque force on the bolts compared to the prior art flat-face-type seal.

It has been found that, for the most effective sealing function, the ribs 28 should extend above the main body 26 a distance of at least half the thickness of the main body, and in any event, at least one sixteenth inch irrespective of the thickness of the main body. Further it has been found that the rubber should have a durometer hardness reading of at least 45, and preferably it should be between 65 and 70 to effectively seal in this way.

With respect to the configuration of the gasket 24, the longitudinally extending beads 28 and lips 30 provide a configuration which is readily adaptable to manufacturing by the extrusion process. A continuous strip having essentially the cross section shown in FIG. 4 can be continuously extruded. This strip is then cut to desired lengths and the ends of the lips 32 trimmed to readily, easily and inexpensively form the gasket of the present invention. This extrusion and trimming process for forming the gasket is much less expensive than the molding processes which have been required in the past for "waffle"-type gaskets; and the seal provided by the present gasket is at least as good as with the waffle-type gasket utilizing the same or less torque pressure on the bolts.

In illustrating the present invention, the previously described embodiment has been shown as a gasket extending around the full circumference of a pipe and meeting in a butt joint. However, there are gaskets of a similar type, which are used in band clamps, which extend only partially around the outside of the pipe. The present design of gasket having band-engaging lips and circumferentially extending beads is also adapted for use in this type of a clamp. Such a gasket is shown in FIG. 5. In this embodiment, a band clamp designated generally as 40 is shown which includes a circumferentially extending band member 42 of which a fragmentary section is shown, on which a gasket 44 is mounted. As can be seen, the gasket 44 extends only partially around the band 42. As in the previous embodiment, the gasket 44 is provided with a plurality of circumferentially extending beads 46 and band-engaging lips 48. However, in this case, the opposite ends of the gasket 44 are provided with raised ribs 50, which extend transversely to the beads 46, and against which the beads 46 terminate. These ribs are necessary to provide a closed fluid tight seal, since the beads 46 do not extend a full 360° to confront each other, as is the case of the beads 28 of the previously described embodiment. Thus, the ribs 50 in conjunction with the beads 46 provide such a fluid tight seal.

In this case also, the gasket can be formed by the extrusion process, but an additional forming operation is required to form each of the ribs 50. Again in this embodiment, as in the previous embodiments, the lips 48 positively position the gasket with respect to the band, but do not restrict its flow during tightening of the clamp.

The described embodiments have utilized raised beads and ribs where necessary to provide the narrow circumferentially sealing surfaces of the gasket, and such beads and ribs constitute the preferred way of forming such surfaces. However, it is contemplated that other techniques could be employed, such as by using rigid element between the band and a gasket having a flat face to physically deform the gasket under pressure to the desired sealing surface configuration.

What we claim is:

1. A gasket and clamping member combination for sealing against a pipe comprising, a sheet of elastomeric material having spaced opposite ends, and a plurality of circumferentially extending spaced raised beads sealing against the outer surface of said pipe defining a continuous fluid tight chamber between each pair of adjacent beads, the end of said sheet being disposed to meet in abutting relationship with the ends of the beads being in abutting contact.

2. The invention as defined in claim 1 further characterized by said beads extending above the sheet of material a distance equal to at least half the thickness of the sheet of material.

3. The invention as defined in claim 1 wherein said beads are convexly curved in cross section.